United States Patent
Noda et al.

(10) Patent No.: US 12,489,271 B2
(45) Date of Patent: Dec. 2, 2025

(54) TWO-DIMENSIONAL PHOTONIC-CRYSTAL LASER

(71) Applicants: KYOTO UNIVERSITY, Kyoto (JP); MITSUBISHI ELECTRIC CORPORATION, Tokyo (JP)

(72) Inventors: Susumu Noda, Kyoto (JP); Menaka De Zoysa, Muko (JP); Kenji Ishizaki, Kyoto (JP); Wataru Kunishi, Kyoto (JP); Kentaro Enoki, Nishinomiya (JP)

(73) Assignees: KYOTO UNIVERSITY, Kyoto (JP); MITSUBISHI ELECTRIC CORPORATION, Tokyo (JP)

( * ) Notice: Subject to any disclaimer, the term of this patent is extended or adjusted under 35 U.S.C. 154(b) by 655 days.

(21) Appl. No.: 17/908,202

(22) PCT Filed: Mar. 17, 2021

(86) PCT No.: PCT/JP2021/010882
§ 371 (c)(1),
(2) Date: Aug. 30, 2022

(87) PCT Pub. No.: WO2021/200168
PCT Pub. Date: Oct. 7, 2021

(65) Prior Publication Data
US 2023/0361530 A1   Nov. 9, 2023

(30) Foreign Application Priority Data

Mar. 31, 2020   (JP) .................................. 2020-062586

(51) Int. Cl.
*H01S 5/11* (2021.01)
*H01S 5/042* (2006.01)
(Continued)

(52) U.S. Cl.
CPC ............ *H01S 5/11* (2021.01); *H01S 5/04256* (2019.08); *H01S 5/18305* (2013.01);
(Continued)

(58) Field of Classification Search
CPC ...... H01S 5/11; H01S 5/04256; H01S 5/2027; H01S 5/3095; H01S 5/04254; H01S 5/34313; H01S 5/04257; H01S 5/185
See application file for complete search history.

(56) References Cited

U.S. PATENT DOCUMENTS

| | | | |
|---|---|---|---|
| 2002/0137245 A1 | 9/2002 | Kitamura et al. | |
| 2005/0083979 A1* | 4/2005 | Leary ................. | H01S 5/18308 372/43.01 |

(Continued)

FOREIGN PATENT DOCUMENTS

| | | | | |
|---|---|---|---|---|
| DE | 112016003950 T5 * | 5/2018 | ........... | H01S 5/0425 |
| JP | 2002-368334 A | 12/2002 | | |

(Continued)

OTHER PUBLICATIONS

Hedlund et al., "Buried-Tunnel Junction Current Injection for InP-Based Nanomembrane Photonic Crystal Surface Emitting Lasers on Silicon," Physica Status Solidi A, 2020, vol. 217, 1900527, pp. 1-5.

(Continued)

*Primary Examiner* — Xinning(Tom) Niu
(74) *Attorney, Agent, or Firm* — Oliff PLC

(57) ABSTRACT

A two-dimensional photonic-crystal laser includes: a substrate made of an n-type semiconductor; a p-type cladding layer on an upper side of the substrate made of a p-type semiconductor; an active layer on an upper side of the cladding layer; a two-dimensional photonic-crystal layer on an upper side of the active layer including a plate-shaped base body made of an n-type semiconductor wherein modi- (Continued)

fied refractive index areas whose refractive index differs from the base body are arranged; a first tunnel layer between the substrate and cladding layer made of an n-type semiconductor having a carrier density higher than the substrate's; a second tunnel layer between the first tunnel and cladding layers, made of a p-type semiconductor having a carrier density higher than the p-type semiconductor layer's; a first electrode on a lower side of or in the substrate; and a second electrode on an upper side of the two-dimensional photonic-crystal layer.

6 Claims, 6 Drawing Sheets

(51) Int. Cl.
  *H01S 5/183* (2006.01)
  *H01S 5/20* (2006.01)
  *H01S 5/30* (2006.01)
  *H01S 5/343* (2006.01)

(52) U.S. Cl.
  CPC .......... *H01S 5/2027* (2013.01); *H01S 5/3095* (2013.01); *H01S 5/04254* (2019.08); *H01S 5/18347* (2013.01); *H01S 5/34313* (2013.01)

(56) References Cited

U.S. PATENT DOCUMENTS

| | | | |
|---|---|---|---|
| 2007/0036189 A1* | 2/2007 | Hori | H01S 5/18358 372/50.11 |
| 2007/0201527 A1* | 8/2007 | Hori | H01S 5/18333 372/102 |
| 2008/0220550 A1 | 9/2008 | Tomida | |
| 2009/0034572 A1 | 2/2009 | Ikuta | |
| 2009/0285255 A1 | 11/2009 | Sakai et al. | |
| 2013/0039375 A1* | 2/2013 | Noda | H01S 5/04256 372/44.01 |
| 2014/0103291 A1 | 4/2014 | Mastro | |
| 2015/0034901 A1 | 2/2015 | Noda et al. | |
| 2019/0013647 A1 | 1/2019 | Higuchi et al. | |
| 2019/0312412 A1* | 10/2019 | Kurosaka | H01S 5/34313 |

FOREIGN PATENT DOCUMENTS

| | | |
|---|---|---|
| JP | 2007-258262 A | 10/2007 |
| JP | 2007-273849 A | 10/2007 |
| JP | 2008-226884 A | 9/2008 |
| JP | 2009-038062 A | 2/2009 |
| JP | 2009-054789 A | 3/2009 |
| JP | 2012-033705 A | 2/2012 |
| JP | 2012-119408 A | 6/2012 |
| JP | 2013-161965 A | 8/2013 |
| JP | 2017-188697 A | 10/2017 |
| JP | 2018-144664 A | 9/2018 |
| JP | 2019-012744 A | 1/2019 |
| JP | 2019-016750 A | 1/2019 |
| WO | 2018/164001 A1 | 9/2018 |
| WO | 2019/152611 A1 | 8/2019 |

OTHER PUBLICATIONS

May 25, 2021 International Search Report issued in International Patent Application No. PCT/JP2021/010882.
May 25, 2021 Written Opinion of the International Searching Authority issued in International Patent Application No. PCT/JP2021/010882.
Feb. 22, 2022 International Preliminary Report on Patentability issued in International Patent Application No. PCT/JP2021/010882.
Sep. 29, 2023 Extended Search Report issued in European Patent Application No. 21781958.0.
Feb. 18, 2025 Office Action issued in Japanese Patent Application No. 2022-511852.
Nov. 12, 2024, Office Action issued in Japanese Patent Application No. 2022-511852.

* cited by examiner

EMIT LASER LIGHT

TWO-DIMENSIONAL PHOTONIC-CRYSTAL LASER

TECHNICAL FIELD

The present invention relates to a two-dimensional photonic-crystal laser in which a two-dimensional photonic crystal is used for amplifying light.

BACKGROUND ART

The two-dimensional photonic-crystal laser includes an active layer and a two-dimensional photonic-crystal layer. The active layer generates light within a specific wavelength band when supplied with carriers (carrier holes or electrons). The two-dimensional photonic-crystal layer has a configuration including a plate-shaped base body in which modified refractive index areas whose refractive index differs from that of the base body are periodically arranged two-dimensionally. The modified refractive index areas include holes (air) formed in the base body or a member different from the material of the base body. In the two-dimensional photonic-crystal laser, only a specific wavelength of light corresponding to the lattice constant of the arrangement of the modified refractive index areas in the light generated in the active layer is amplified and causes a laser oscillation, to be eventually emitted as a laser beam in a direction perpendicular to the photonic-crystal layer.

The two-dimensional photonic-crystal laser generally includes layers having various functions in addition to the active layer and the two-dimensional photonic-crystal layer described above. For example, the two-dimensional photonic-crystal laser described in Patent Literature 1 has a structure in which a first cladding layer, an active layer, a carrier block layer, a two-dimensional photonic-crystal layer, a second cladding layer, and a contact layer are stacked in the mentioned order on a substrate. The lower face of the substrate and the upper face of the contact layer are each provided with an electrode. Each layer other than the electrode is stacked by epitaxially growing on the substrate. As a material of the substrate, an n-type semiconductor, which is less expensive than a p-type semiconductor, is used. For the first cladding layer, a semiconductor having the same polarity as the substrate, n-type, is used, and for the carrier block layer, the base body of the two-dimensional photonic-crystal layer, the second cladding layer, and the contact layer, p-type semiconductors are used. In this type of two-dimensional photonic-crystal laser, carrier holes are supplied into the active layer from the upper electrode through the contact layer, the second cladding layer, and the base body of the two-dimensional photonic-crystal layer, and electrons are supplied into the active layer from the lower electrode through the substrate and the first cladding layer.

The first cladding layer and the second cladding layer are provided in order to enhance the confinement of light between the first cladding layer and the second cladding layer, so that the light emission efficiency in the active layer and the light amplification efficiency in the photonic-crystal layer are improved. The carrier block layer is provided in order to prevent carrier electrons from entering the photonic-crystal layer. The contact layer is provided in order to facilitate supply of carrier holes from the upper electrode.

CITATION LIST

Patent Literature

Patent Literature 1: JP 2007-258262 A
Patent Literature 2: JP 2012-033705 A
Patent Literature 3: JP 2018-144664 A

SUMMARY OF INVENTION

Technical Problem

The two-dimensional photonic-crystal laser described in Patent Literature 1 uses, as described above, a p-type semiconductor material as a base body of the two-dimensional photonic-crystal layer. In general, since carrier holes are lower in mobility than electrons, the material of a base body of the two-dimensional photonic-crystal layer is selected from p-type semiconductors in which the band gap, the concentration of impurities, and the like are designed so that the density of carriers (holes) in the two-dimensional photonic-crystal layer is higher than the density of carriers (electrons) in the substrate using an n-type semiconductor and the first and second cladding layers using an n-type semiconductor. However, when light generated in the active layer is amplified in the two-dimensional photonic-crystal layer, carrier holes which are free carriers absorb a portion of light, and thus, there arises a problem that when the density of carrier holes in the two-dimensional photonic-crystal layer increases, the efficiency of laser oscillation decreases.

Patent Literature 2 describes a two-dimensional photonic-crystal laser having a structure similar to that of Patent Literature 1, in which it describes a substrate and a first cladding layer including a p-type semiconductor may be used, and a second cladding layer and a contact layer including an n-type semiconductor may be used. In this configuration, since the n-type semiconductor is used as the base body of the two-dimensional photonic-crystal layer, the carrier (electron) density can be made lower than that in the case of using the p-type semiconductor. Therefore, light absorption can be suppressed. However, since the substrate needs to be thicker than other layers, if a p-type semiconductor, which is more expensive than an n-type semiconductor, is used as the substrate, the material cost of the two-dimensional photonic-crystal laser rises.

Patent Literature 3 describes a photonic-crystal laser having a configuration in which a cladding layer made of an n-type semiconductor, a two-dimensional photonic-crystal layer having a base body made of an n-type semiconductor, an active layer, a carrier block layer made of a p-type semiconductor, a cladding layer made of a p-type semiconductor, and a contact layer made of a p-type semiconductor are stacked in the mentioned order on a substrate made of an n-type semiconductor. Also in this configuration, since the base body of the two-dimensional photonic-crystal layer is an n-type semiconductor, absorption of light by free carriers can be suppressed as compared with the case of using a p-type semiconductor. However, in a case where the modified refractive index areas of the two-dimensional photonic-crystal layer include holes, irregularities are formed on the surface opposite to the substrate. Also in a case where the modified refractive index areas are made of members having a material different from that of the base body, it is difficult to prepare the modified refractive index areas without forming irregularities on the surface of the two-dimensional photonic-crystal layer. Even when another layer is formed on the face having such irregularities, the irregularities remain on the upper face of the layer. In the semiconductor light-emitting element of Patent Literature 3, it is necessary to stack an active layer on such a face having irregularities, but since the active layer is generally made by stacking a plurality of semiconductor layers thinner than other layers in a two-dimensional photonic-crystal laser, it is difficult to stack an active layer having desired characteristics on such a surface having irregularities.

An object of the present invention is to provide a two-dimensional photonic-crystal laser capable of suppressing decrease in the efficiency of laser oscillation in a two-dimensional photonic-crystal layer and that can be easily manufactured without increasing material cost.

Solution to Problem

A two-dimensional photonic-crystal laser according to the present invention made to solve the above problems includes:
  a) a substrate made of an n-type semiconductor;
  b) a p-type semiconductor layer provided on an upper side of the substrate and made of a p-type semiconductor;
  c) an active layer provided on an upper side of the p-type semiconductor layer;
  d) a two-dimensional photonic-crystal layer provided on an upper side of the active layer and including a plate-shaped base body made of an n-type semiconductor in which modified refractive index areas whose refractive index differs from the base body are periodically arranged;
  e) a first tunnel layer provided between the substrate and the p-type semiconductor layer and made of an n-type semiconductor having a carrier density higher than a carrier density of the substrate;
  f) a second tunnel layer provided in contact with the first tunnel layer between the first tunnel layer and the p-type semiconductor layer, and made of a p-type semiconductor having a carrier density higher than a carrier density of the p-type semiconductor layer;
  g) a first electrode provided on a lower side of the substrate or in the substrate; and
  h) a second electrode provided on an upper side of the two-dimensional photonic-crystal layer.

It should be noted that here, the terms "upper" and "lower" are used for convenience in order to describe the positional relationship among the constituent elements, but these terms do not limit the orientation of the two-dimensional photonic-crystal laser according to the present invention.

Before the operation of the two-dimensional photonic-crystal laser according to the present invention is described, the roles of the first tunnel layer and the second tunnel layer will be described. In general, in a case where an n-type semiconductor layer made of an n-type semiconductor and a p-type semiconductor layer made of a p-type semiconductor are in contact with each other, carrier holes can pass the border when a voltage that is positive on the p-type semiconductor layer side is applied, but cannot pass when a voltage that is positive on the n-type semiconductor layer side is applied. However, by providing the first tunnel layer higher in carrier (electron) density than the n-type semiconductor layer rather close to the n-type semiconductor layer between the n-type semiconductor layer and the p-type semiconductor layer, and the second tunnel layer higher in carrier (carrier hole) density than the p-type semiconductor layer rather closer to the p-type semiconductor layer between the n-type semiconductor layer and the p-type semiconductor layer, carrier holes can pass from the n-type semiconductor layer to the p-type semiconductor layer by the tunnel effect even when a voltage that is positive on the n-type semiconductor layer side is applied. The carrier (electron or carrier hole) densities can be designed by reducing the band gap of the p-type or n-type semiconductor, increasing the impurity concentration, or the like.

An operation of the two-dimensional photonic-crystal laser according to the present invention will be described. In this two-dimensional photonic-crystal laser, by applying a voltage between the first electrode and the second electrode, with positive on the first electrode side and negative on the second electrode side, carrier holes are supplied from the first electrode, and electrons are supplied from the second electrode. Then, since the first tunnel layer is higher in carrier density than the substrate (corresponding to the n-type semiconductor layer) and the second tunnel layer is higher in carrier density than the p-type semiconductor layer, carrier holes supplied from the first electrode pass through the first tunnel layer and the second tunnel layer by the tunnel effect from the substrate, reach the p-type semiconductor layer, and are supplied into the active layer as described above. On the other hand, electrons supplied from the second electrode pass through the two-dimensional photonic crystal and are supplied into the active layer. Light is generated in the active layer when carrier holes and electrons are supplied into the active layer in this manner, and laser oscillation is caused when the light is amplified in the two-dimensional photonic-crystal layer.

According to the two-dimensional photonic-crystal laser according to the present invention, since the n-type semiconductor is used as the base body of the two-dimensional photonic-crystal layer, the carrier density when the electric current of the same magnitude flows can be reduced as compared with the case where the p-type semiconductor is used as the base body. Therefore, it is possible to suppress absorption of a portion of light by free carriers in the two-dimensional photonic-crystal layer, and prevent decrease in the efficiency of laser oscillation.

In addition, in the two-dimensional photonic-crystal laser according to the present invention, since an n-type semiconductor, which is less expensive than a p-type semiconductor, is used as a substrate, it is possible to prevent the material cost from rising.

Furthermore, in the two-dimensional photonic-crystal laser according to the present invention, since the two-dimensional photonic-crystal layer is provided on the opposite side of the substrate as viewed from the active layer, the active layer can be stacked without being affected by the irregularities of the surface of the two-dimensional photonic-crystal layer, so that the active layer having desired characteristics can be easily made.

Another layer including an n-type semiconductor may be provided between the substrate and the first tunnel layer, between the active layer and the photonic-crystal layer, and/or between the photonic-crystal layer and the second electrode. For example, a carrier block layer made of an n-type semiconductor may be provided between the active layer and the two-dimensional photonic-crystal layer. A cladding layer made of an n-type semiconductor or a contact layer made of an n-type semiconductor may be provided between the two-dimensional photonic-crystal layer and the second electrode.

In addition, another layer (for example, a reflection layer between the second tunnel layer and the p-type semiconductor layer, which will be described below) made of a p-type semiconductor may be provided between the second tunnel layer and the p-type semiconductor layer and/or between the p-type semiconductor layer and the active layer. In this case, laser light is emitted from the second electrode side to the outside of the two-dimensional photonic-crystal laser.

Since the first tunnel layer and the second tunnel layer become higher in carrier density than the substrate and the p-type semiconductor layer, larger absorption of laser light by free carriers may occur. Therefore, it is desirable that the two-dimensional photonic-crystal laser according to the present invention further include a reflection layer configured to reflect laser light generated in the two-dimensional photonic-crystal layer between the second tunnel layer and the p-type semiconductor layer. This makes it possible to prevent a portion of laser light from being absorbed in the first tunnel layer and the second tunnel layer that become higher in carrier density than the other layers. As such a reflection layer, it is possible to use, for example, a distribution Bragg reflector (DBR) in which a plurality of layers including two types of p-type semiconductors having different refractive indices are alternately stacked.

Alternatively, a reflection layer may be provided between the two-dimensional photonic-crystal layer and the second electrode. In this case, another layer (the above-described cladding layer or contact layer) including an n-type semiconductor may be present between the two-dimensional photonic-crystal layer and the reflection layer and/or between the reflection layer and the second electrode. In this case, the laser light is emitted from the first electrode side to the outside of the two-dimensional photonic-crystal laser.

The two-dimensional photonic-crystal laser according to the present invention can have a configuration including:
a groove provided from a surface on an upper side of the two-dimensional photonic-crystal laser, having a bottom face at a position between an upper face and a lower face of the substrate, and having a frame-like shape in a cross section parallel to the two-dimensional photonic-crystal layer, and in which
the first electrode is provided on a bottom face of the groove.

By providing the first electrode on the bottom face (therefore, in the substrate) of the groove having the bottom face at the position between the upper face and the lower face of the substrate, the electric resistance between the first electrode and the active layer becomes smaller than that in a case where the first electrode is provided on the lower face of the substrate, and charges can be more efficiently supplied to the active layer. In addition, since the first electrode is provided on the bottom face of the groove having a frame-like planar shape, the shape of the first electrode also becomes frame-like, and the laser light caused by laser oscillation in the two-dimensional photonic-crystal layer passes through the frame of the first electrode and is emitted from the surface of the substrate to the outside. Therefore, it is possible to suppress the first electrode from hindering emission of laser light and causing unnecessary diffraction. Furthermore, in a case where the first electrode is provided on the lower face of the substrate, the layers of the second tunnel layer, the first tunnel layer, the p-type semiconductor layer, and the like should be prepared on one face of the substrate, and the first electrode should be prepared on the other face. Therefore, it is necessary to invert the upper and lower sides of the substrate during manufacturing. On the other hand, in a case where the first electrode is provided on the bottom face of such a groove, the first electrode is made on the same side as the second tunnel layer and the like. Therefore, it is not necessary to invert the upper and lower sides of the substrate during manufacturing, and the production becomes easy.

For example, n-type GaAs or n-type AlGaAs in which GaAs or a portion of Ga in GaAs is substituted with Al can be used as the material of the substrate and the base body of the two-dimensional photonic-crystal layer, and p-type GaAs or p-type AlGaAs can be used for the p-type semiconductor layer. In this example, it is preferable that InGaAs is used for the first tunnel layer and the second tunnel layer. InGaAs has a small band gap among GaAs and AlGaAs, and can increase the carrier density. However, since InGaAs easily absorbs light, when InGaAs is used as a material of the first tunnel layer or the second tunnel layer, it is desirable to provide a reflection layer between the second tunnel layer and the p-type semiconductor layer as described above.

In the two-dimensional photonic-crystal laser according to the present invention, a non-carrier-doped semiconductor may be used in place of the n-type semiconductor for the entire or a portion of the base body. In the case of using a non-carrier-doped semiconductor for a portion of the base body (n-type semiconductor for the remaining portion), an electric current easily flows from the second electrode side to the active layer side as compared with the case where the entire base body includes a non-carrier-doped semiconductor while suppressing absorption loss of light by free carriers as compared with the case where the entire base body includes an n-type semiconductor. In addition, use of the non-carrier-doped semiconductor for the entire base body, the absorption loss of light can be further suppressed.

Advantageous Effects of Invention

Owing to the two-dimensional photonic-crystal laser according to the present invention, it is possible to suppress decrease in the efficiency of laser oscillation in the two-dimensional photonic-crystal layer, and it is possible to easily manufacture the two-dimensional photonic-crystal laser without increasing the material cost.

DESCRIPTION OF EMBODIMENTS

Embodiments of the two-dimensional photonic-crystal laser according to the present invention will be described with reference to FIGS. 1 to 7.

(1) Configuration of Two-Dimensional Photonic-Crystal Laser of First Embodiment

Figure 1:
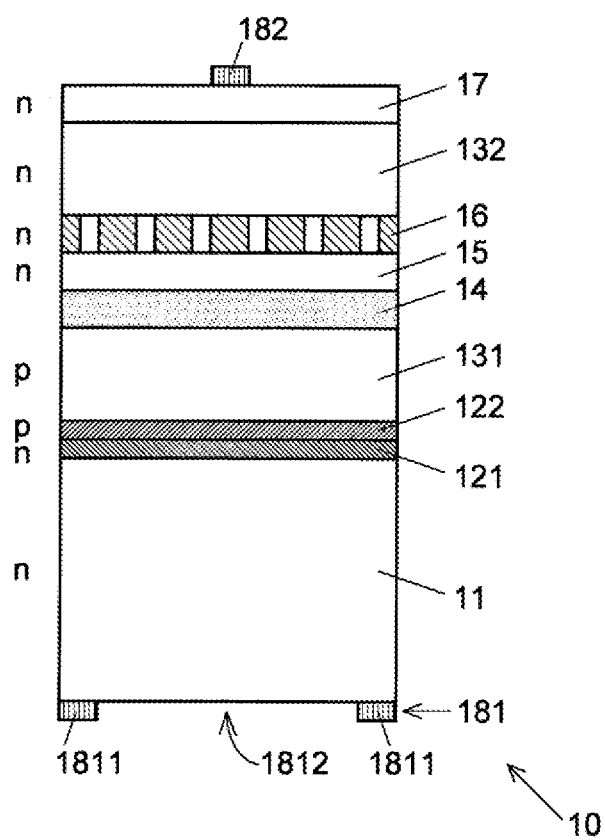
FIG. 1 is a schematic configuration diagram illustrating a first embodiment of a two-dimensional photonic-crystal laser according to the present invention.

A two-dimensional photonic-crystal laser 10 of the first embodiment has a configuration in which a substrate 11, a first tunnel layer 121, a second tunnel layer 122, a p-type cladding layer (p-type semiconductor layer in the present invention) 131, an active layer 14, a carrier block layer 15, a two-dimensional photonic-crystal layer 16, an n-type cladding layer 132, and a contact layer 17 are sequentially stacked in order from the lower side of FIG. 1. A lower side of the substrate 11 (opposite side of the first tunnel layer 121) is provided with a first electrode 181, and an upper side of the contact layer 17 (opposite side of the n-type cladding layer 132) is provided with a second electrode 182.

The substrate 11 includes an n-type semiconductor, and the first tunnel layer 121 includes an n-type semiconductor higher in carrier (electron) density than that of the substrate 11. The p-type cladding layer 131 includes a p-type semiconductor, and the second tunnel layer 122 includes a p-type semiconductor higher in carrier (carrier hole) density than that of the p-type cladding layer 131.

The active layer 14 generates light emission within a specific emission wavelength band upon being supplied with carrier holes and electrons. The active layer 14 includes, for example, a multiple-quantum well (MQW) in which a thin film including indium gallium arsenide (InGaAs) and a thin film including gallium arsenide (GaAs) are alternately stacked in large numbers.

Figure 2:
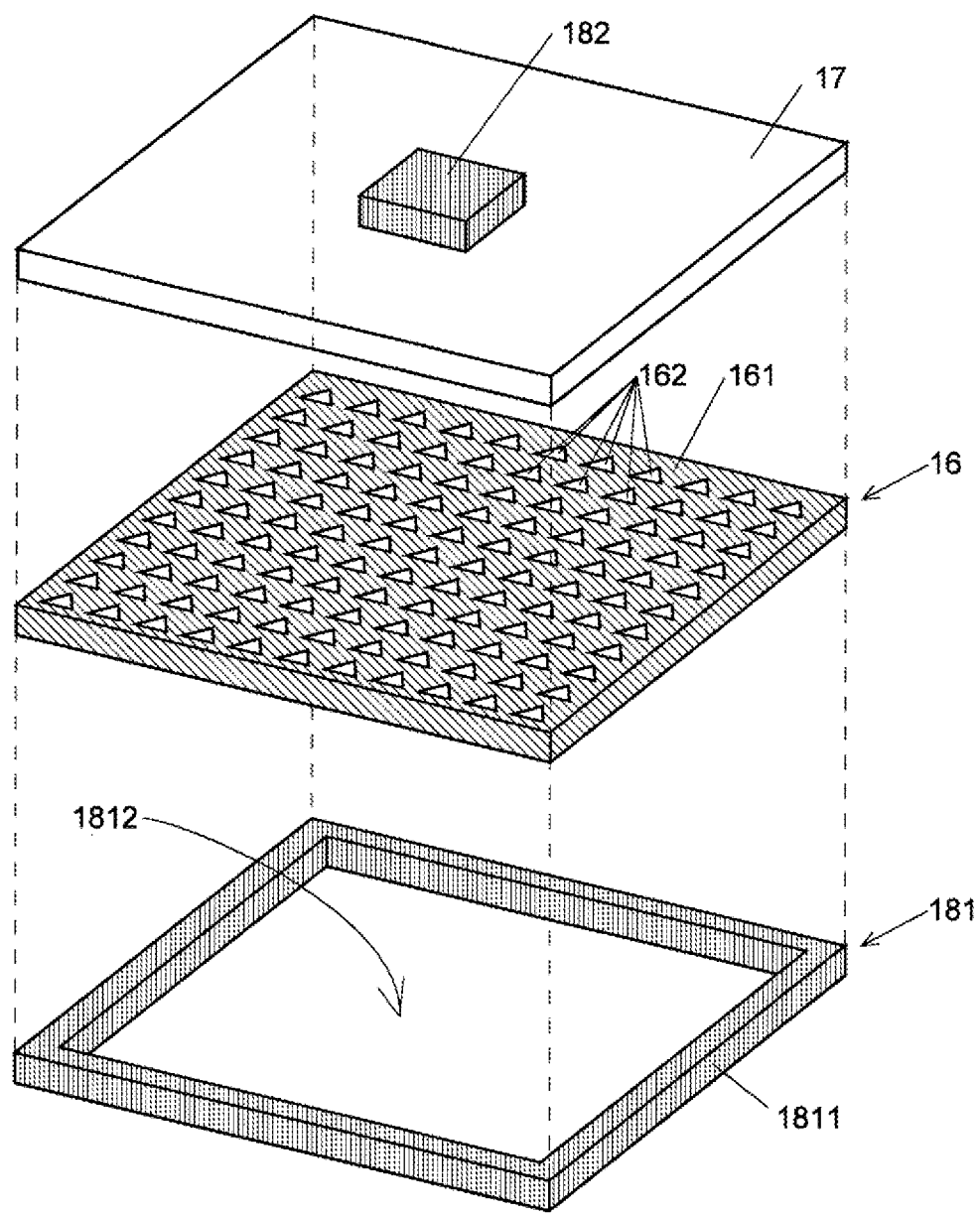
FIG. 2 is a perspective view illustrating a photonic-crystal layer, a first electrode, and a second electrode included in the two-dimensional photonic-crystal laser of the first embodiment.
Figure 3:
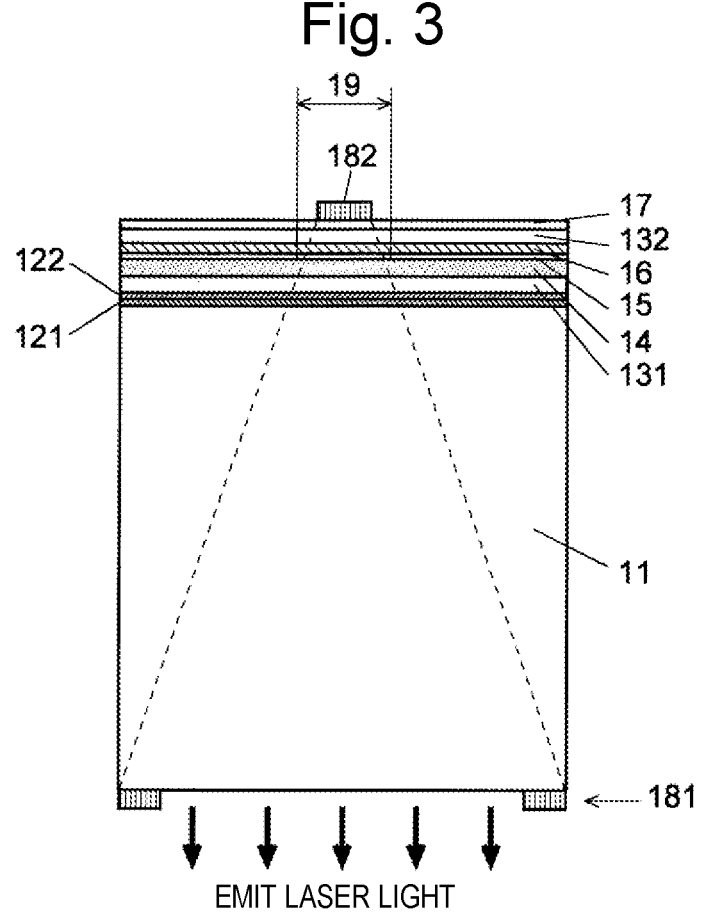
FIG. 3 is a view schematically illustrating a carrier supply area in an active layer of the two-dimensional photonic-crystal laser of the first embodiment.

As illustrated in FIG. 2, the two-dimensional photonic-crystal layer 16 has a configuration in which a plurality of modified refractive index areas 162 are periodically arranged two-dimensionally in a plate-shaped base body 161 made of an n-type semiconductor. The modified refractive index areas 162 typically include holes (air), but members including a material other than the base body 161 may be used. The arrangement of the modified refractive index areas 162 has a square lattice shape in the example illustrated in FIG. 2, but may have another shape such as a triangular lattice shape. In addition, the planar shape of the modified refractive index area 162 is an equilateral triangle in the example illustrated in FIG. 2, but may be other shapes including a triangle such as a right triangle other than the equilateral triangle, a circle, and an ellipse. In addition, one modified refractive index area 162 may be configured by combining a plurality of holes or a member including a material other than the base body 161.

The carrier block layer 15, the n-type cladding layer 132, and the contact layer 17 each include an n-type semiconductor.

The first electrode 181 is a plate-shaped conductor having a hollow portion formed inside, and has a frame portion 1811, which is a portion where the conductor remains, and a window portion 1812, which is the hollow portion of the conductor (see FIG. 2). The second electrode 182 includes a conductor plate provided at a position opposing the window portion 1812 of the first electrode 181 and having an area smaller than that of the window portion 1812 (see FIG. 2).

A specific example of the material of each constituent element in the two-dimensional photonic-crystal laser 10 will be described. It is possible to use n-type GaAs for the substrate 11, n-type GaAs (for example, 10 to 100 times) higher in impurity concentration than that of the substrate 11 for the first tunnel layer 121, p-type AlGaAs for the p-type cladding layer 131, and GaAs (for example, 10 to 100 times) higher in impurity concentration than that of the p-type cladding layer 131 for the second tunnel layer 122. In addition, n-type AlGaAs can be used for each of the carrier block layer 15, the base body 161 of the two-dimensional photonic-crystal layer 16, and the n-type cladding layer 132, and the impurity concentrations of these three layers may be the same or different. For the contact layer 17, n-type GaAs can be used. The impurity concentration in each layer other than the first tunnel layer 121 and the second tunnel layer 122 is set to be (for example, 10 to 100 times) higher in each layer made of a p-type semiconductor than in each layer made of an n-type semiconductor. It should be noted that the material of each layer described here is an example, and another p-type semiconductor can be used in each layer for which p-type GaAs or AlGaAs is exemplified, and another n-type semiconductor can be used in each layer for which n-type GaAs or AlGaAs is exemplified. These GaAs and AlGaAs can transmit light within a wavelength band of 0.7 to 1.0 μm.

As a material of each of these layers, a semiconductor such as InP, GaN, or AlInGaAsP other than GaAs and AlGaAs may be used.

The first tunnel layer 121 can be stacked by epitaxially growing on the substrate 11. Similarly, each layer from the second tunnel layer 122 to the contact layer 17 can be stacked by epitaxially growing each layer of the immediate layer on the substrate 11 side.

The first electrode 181 and the second electrode 182 can be made using a method such as a vapor deposition method with a metal such as gold as a material.

The thickness of the substrate 11 is made sufficiently larger than the thickness of each layer from the first tunnel layer 121 to the contact layer 17. This makes the distance between the second electrode 182 and the active layer 14 sufficiently smaller than the distance between the first electrode 181 and the active layer 14. In addition, the thicknesses of the first tunnel layer 121 and the second tunnel layer 122 are made sufficiently smaller than the thicknesses of the respective layers from the substrate 11 and the p-type cladding layer 131 to the contact layer 17. This makes it easier for carrier holes supplied from the first electrode 181 as described later to easily reach the p-type cladding layer 131 (further, the active layer 14 via the p-type cladding layer 131). The thickness of each layer is, for example, equal to or greater than 60 μm for the substrate 11, 10 to 2000 nm for the first tunnel layer 121, 10 to 2000 nm for the second tunnel layer 122, 1 to 10 μm for the p-type cladding layer 131, 1 to 100 nm for the active layer 14, 10 to 100 nm for the carrier block layer 15, 10 to 1000 nm for the two-dimensional photonic-crystal layer 16, 1 to 2 μm for the n-type cladding layer 132, and 10 to 500 nm for the contact layer 17.

(2) Operation of Two-Dimensional Photonic-Crystal Laser of First Embodiment

An operation of the two-dimensional photonic-crystal laser 10 of the first embodiment will be described. When this two-dimensional photonic-crystal laser 10 is used, a voltage that is positive on the first electrode 181 side and negative on the second electrode 182 side is applied between these two electrodes. This causes carrier holes to be supplied from the first electrode 181 into the two-dimensional photonic-crystal laser 10, and electrons to be supplied from the second electrode 182 into the two-dimensional photonic-crystal laser 10.

Carrier holes supplied from the first electrode 181 pass through the substrate 11, the first tunnel layer 121, the second tunnel layer 122, and the p-type cladding layer 131, and are introduced into the active layer 14. Here, since the substrate 11 and the first tunnel layer 121 include an n-type semiconductor, and the second tunnel layer 122 and the p-type cladding layer 131 includes a p-type semiconductor, a reverse bias voltage that is positive on the n-type semiconductor side and negative on the p-type semiconductor side is applied at a boundary between the first tunnel layer 121 and the second tunnel layer 122. As well known in diodes, when such a reverse bias voltage is applied, an electric current that crosses the boundary between an n-type semiconductor and a p-type semiconductor usually hardly flows. However, in the present invention, since the impurity concentration of the first tunnel layer 121 is higher than that of the substrate 11 and the impurity concentration in the second tunnel layer 122 is higher than that of the p-type cladding layer 131, it becomes possible to achieve a state in which the carrier (electron) density in the first tunnel layer 121 and the carrier (carrier hole) density in the second tunnel layer 122 are high. This allows the carrier holes supplied from the first electrode 181 and introduced into the first tunnel layer 121 from the substrate 11 side to move to the second tunnel layer 122 by the tunnel effect, and are introduced into the active layer 14 from the second tunnel layer 122 through the p-type cladding layer 131.

On the other hand, electrons supplied from the second electrode 182 are introduced into the active layer 14 through the contact layer 17, the two-dimensional photonic-crystal layer 16, and the carrier block layer 15. It should be noted that the carrier block layer 15 prevents carrier holes from moving from the active layer 14 to the two-dimensional photonic-crystal layer 16, and can cause electrons supplied from the two-dimensional photonic-crystal layer 16 side to move to the active layer 14.

When carrier holes and electrons are introduced into the active layer 14 in this manner, light emission within a specific emission wavelength band is generated in the active layer 14. At this time, since the area of the first electrode 181 is larger than the area of the second electrode 182 and the distance between the first electrode 182 and the active layer 14 is sufficiently smaller than the distance between the second electrode 181 and the active layer 14, the area of a charge supply area 19 (see FIG. 3) into which carrier holes and electrons are supplied of the active layer 14 is close to the area of the second electrode 182 and becomes sufficiently smaller than the area of the first electrode 181. By intensively supplying charges into the charge supply area 19 having such a small area, it is possible to increase the output per unit area of light generated in the active layer 14. It should be noted that although the ratio of the thicknesses of each layer is not accurately illustrated in FIGS. 1 and 3 for convenience of description, FIG. 3 in which the substrate 11 is illustrated to be sufficiently thicker than the other layers is closer to the actual ratio of the thickness of the substrate 11 and the other layers.

Regarding the light generated in the active layer 14, in the two-dimensional photonic-crystal layer 16, only light having a predetermined wavelength corresponding to the lattice constant of the arrangement of the modified refractive index areas 162 is amplified and laser oscillation occurs. Here, in the two-dimensional photonic-crystal laser 10 of the first embodiment, the base body 161 of the two-dimensional photonic-crystal layer 16 includes an n-type semiconductor, and electrons have higher mobility than carrier holes. Therefore, it is possible to reduce the carrier density when the same magnitude of electric current is passed as compared with a case where the base body 161 includes a p-type semiconductor. Therefore, it is possible to suppress absorption of a portion of light by free carriers (electrons) in the base body 161, and it is possible to suppress decrease in the efficiency of laser oscillation.

For example, in a case where the material of the base body 161 includes n-type GaAs, the mobility of electrons is higher than the mobility of carrier holes when compared with p-type GaAs, and thus the carrier density required for flowing the same magnitude of electric current can be made about ½. In addition to it, rather than the p-type GaAs, n-type GaAs can suppress the absorption coefficient of light in a case where the carrier density is the same to about 40% (in a case where the carrier density is $2\times10^{17}$ cm$^{-3}$). In consideration of these together, use of n-type GaAs for the material of the base body 161 makes it possible to suppress absorption of light to about ⅓ to ⅕ as compared with the case of use of p-type GaAs. It should be noted that although n-type GaAs is used as the material of the base body 161 as an example here, also when another n-type semiconductor such as AlGaAs is used as the material of the base body 161 (although numerical values are different), the carrier density and the absorption coefficient of light can be suppressed, and thus the same effects are achieved.

Together with it, by increasing the output per unit area of the light generated in the active layer 14 as described above, it is possible to easily cause laser oscillation in the two-dimensional photonic-crystal layer 16.

The laser light thus generated is emitted from the window portion 1812 of the first electrode 181 to the outside.

According to the two-dimensional photonic-crystal layer 16 according to the present embodiment, use of the n-type semiconductor as the material of the base body 161 of the two-dimensional photonic-crystal layer 16 makes it possible to suppress absorption of a portion of light by free carriers (electrons), and makes it possible to suppress decrease in the efficiency of laser oscillation.

In addition, since the base body 161 made of an n-type semiconductor is used, it is not necessary to use a substrate made of a p-type semiconductor, and it is possible to suppress the material cost by using the substrate 11 made of a less expensive n-type semiconductor.

Furthermore, by providing the first tunnel layer 121 and the second tunnel layer 122 between the substrate 11 and the p-type cladding layer 131, it is possible to provide the base body 161 on the opposite side of the substrate 11 as viewed from the active layer 14 while using an n-type semiconductor for both the base body 161 and the substrate 11. Since this eliminates the need for preparing the active layer 14 on the two-dimensional photonic-crystal layer 16, the active layer 14 having desired characteristics can be easily prepared without being affected by irregularities generated on the surface of the two-dimensional photonic-crystal layer 16.

Figure 4:
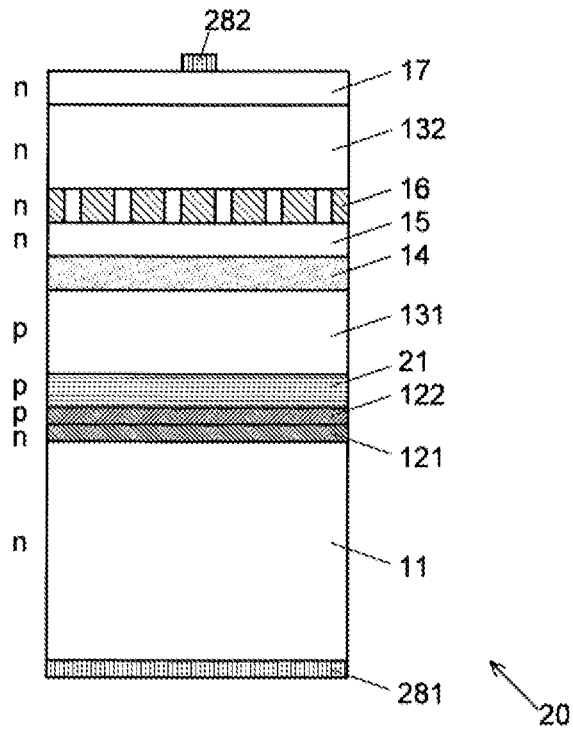
FIG. 4 is a schematic configuration diagram illustrating a second embodiment of the two-dimensional photonic-crystal laser according to the present invention.

(3) Configuration of Two-Dimensional Photonic-Crystal Laser of Second Embodiment A two-dimensional photonic-crystal laser 20 of the second embodiment has a configuration in which the substrate 11, the first tunnel layer 121, the second tunnel layer 122, a reflection layer 21, the p-type cladding layer (p-type semiconductor layer in the present invention) 131, the active layer 14, the carrier block layer 15, the two-dimensional photonic-crystal layer 16, the n-type cladding layer 132, and the contact layer 17 are sequentially stacked in order from the lower side of FIG. 4. A lower side of the substrate 11 (opposite side of the first tunnel layer 121) is provided with a first electrode 281, and an upper side of the contact layer 17 (opposite side of the n-type cladding layer 132) is provided with a second electrode 282. Among these constituent elements, the substrate 11, the p-type cladding layer 131, the active layer 14, the carrier block layer 15, the two-dimensional photonic-crystal layer 16, the n-type cladding layer 132, and the contact layer 17 are similar to the respective constituent elements of the two-dimensional photonic-crystal laser 10 of the first embodiment, and thus description thereof is omitted.

The reflection layer 21 includes a DBR. The DBR used in the present embodiment has a plurality of alternately stacked layers including two types of p-type semiconductors having different refractive indices. For example, two types of layers of p-type AlGaAs having different Al contents are alternately stacked and can be used as the reflection layer 21.

It is similar to the two-dimensional photonic-crystal laser 10 of the first embodiment in that the first tunnel layer 121 includes an n-type semiconductor higher in carrier density than that of the substrate 11, and the second tunnel layer 122 includes a p-type semiconductor higher in carrier density than that of the p-type cladding layer 131. In the present embodiment, both the first tunnel layer 121 and the second tunnel layer 122 use an n-type semiconductor (first tunnel layer 121) and a p-type semiconductor (second tunnel layer 122) that are higher in carrier density than those in the first embodiment. When using GaAs or AlGaAs for each of the substrate 11 and the p-type cladding layer 131 (for example, n-type GaAs for the substrate 11, and p-type AlGaAs for the p-type cladding layer 131), it is possible to suitably use n-type InGaAs for the first tunnel layer 121, and p-type InGaAs for the second tunnel layer 122. InGaAs is a semiconductor that has a band gap smaller than that of GaAs or AlGaAs, and can thereby increase the carrier density.

The first electrode 281 is provided on the lower face of the substrate 11, and the second electrode 282 is provided on the upper face of the contact layer 17. The first electrode 281 is larger in area than the second electrode 282. For example, it is preferable that the first electrode 281 is provided on the entire lower face of the substrate 11, and the second electrode 282 is provided only near the center of the upper face of the contact layer 17. As the material of the second electrode 282, a material transparent with respect to laser light oscillated in the two-dimensional photonic-crystal layer 16 is used. On the other hand, it does not matter whether the material of the first electrode 281 is transparent or opaque with respect to laser light. For example, a metal material such as gold can be used as the material of the first electrode 281, and indium tin oxide (ITO) can be used as the material of the second electrode 282.

(4) Operation of Two-Dimensional Photonic-Crystal Laser of Second Embodiment

An operation of the two-dimensional photonic-crystal laser 20 of the second embodiment will be described. Similarly to that of the first embodiment, when a voltage that is positive on the first electrode 281 side and negative on the second electrode 282 side is applied, carrier holes are supplied from the first electrode 281 and electrons are supplied from the second electrode 282, and light emission in a specific emission wavelength band is generated in the active layer 14. At this time, since the area of the first electrode 281 is larger than the area of the second electrode 282 and the distance between the first electrode 282 and the active layer 14 is sufficiently smaller than the distance between the second electrode 281 and the active layer 14, charges are intensively supplied into an area smaller than that of the first electrode 281 in the active layer 14, and the output per unit area of light generated in the active layer 14 can be increased. Regarding the light generated in the active layer 14, in the two-dimensional photonic-crystal layer 16, only light having a predetermined wavelength corresponding to the lattice constant of the arrangement of the modified refractive index areas 162 is amplified and laser oscillation occurs.

The laser light thus generated is emitted from each of the upper and lower faces of the two-dimensional photonic-crystal layer 16, and the laser light emitted to the first electrode 281 side among them is reflected by the reflection layer 21 and is directed toward the second electrode 282 side without entering the second tunnel layer 122 and the first tunnel layer 121. Therefore, the laser light emitted from any of the upper and lower faces of the two-dimensional photonic-crystal layer 16 is emitted to the outside directly from the upper face of the contact layer 17 or through the second electrode 182.

According to the two-dimensional photonic-crystal laser 20 of the second embodiment, similarly to the two-dimensional photonic-crystal laser 10 of the first embodiment, use of the n-type semiconductor as the material of the base body 161 of the two-dimensional photonic-crystal layer 16 makes it possible to suppress absorption of a portion of light by free carriers (electrons), and makes it possible to suppress decrease in the efficiency of laser oscillation. In addition, it is not necessary to use a substrate made of a p-type semiconductor, and it is possible to suppress the material cost by using the substrate 11 made of a less expensive n-type semiconductor. Furthermore, since by providing the first tunnel layer 121 and the second tunnel layer 122 between the substrate 11 and the p-type cladding layer 131, it is possible to provide the base body 161 on the opposite side of the substrate 11 as viewed from the active layer 14 while using an n-type semiconductor for both the base body 161 and the substrate 11, it is possible to easily prepare the active layer 14 having desired characteristics without being affected by irregularities generated on the surface of the two-dimensional photonic-crystal layer 16.

In addition to the effects similar to those of the first embodiment, according to the two-dimensional photonic-crystal laser 20 of the second embodiment, since the reflection layer 21 is provided between the second tunnel layer 122 and the p-type cladding layer 131, laser light does not enter the first tunnel layer 121 and the second tunnel layer 122 higher in carrier density than other layers, and a portion of laser light can be prevented from being absorbed in the first tunnel layer 121 and the second tunnel layer 122. In addition, since the absorption of the laser light is prevented in this manner, a material higher in carrier density than the material used in the first embodiment such as InGaAs can be used as the material of the first tunnel layer 121 and the second tunnel layer 122, and thus, the carrier density supplied into the active layer 14 can be further increased and the intensity of the laser light can be further increased.

Figure 5:
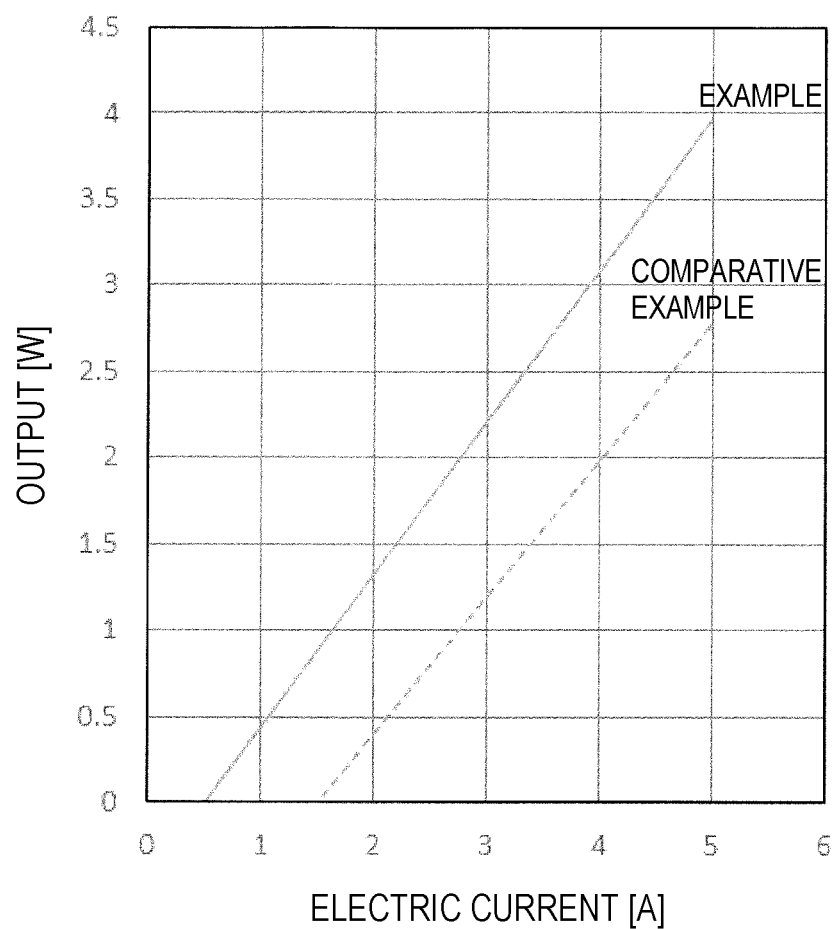
FIG. 5 is a graph presenting results of simulation of optical output characteristics performed for two-dimensional photonic-crystal lasers of the second embodiment and a comparative example.

FIG. 5 presents results of simulation of the device having the structure of Patent Literature 1 (A case where a base body made of a p-type semiconductor is used. Hereinafter, it is referred to as "comparative example".) and the device having the structure of the second embodiment of the present invention (A case where a base body made of a n-type semiconductor is used, Hereinafter, it is referred to as "examples"). As described above, since the use of the n-type semiconductor (n-type GaAs) makes it possible to suppress absorption of light to about ⅓ to ⅕ as compared with the case of use of the p-type semiconductor (p-type GaAs), simulation was performed with the absorption loss of 5 cm$^{-1}$ in the comparative example and with the absorption loss of 1 cm$^{-1}$, which is ⅕ of that in the comparative example, in the example. At this time, the in-plane loss (loss radiated to the outside of the device in the direction parallel to the plane) is calculated as 3 cm$^{-1}$ in both the comparative example and the example, and the radiation coefficient is calculated as 12 cm$^{-1}$ in the comparative example and 8 cm$^{-1}$ in the example. Due to the reduction of the loss, the threshold electric current density is reduced from 0.6 kA·cm$^{-2}$ (comparative example) to 0.2 kA·cm$^{-2}$ (example), and the oscillation threshold electric current value has decreased. The slope efficiency is 0.79 W/A in the comparative example, whereas it is 0.88 W/A in the example. As described above, in the example, due to the reduction of the loss, oscillation with a low threshold and operation with high slope efficiency become possible.

(5) Two-Dimensional Photonic-Crystal Laser of Third Embodiment

Figure 6A:
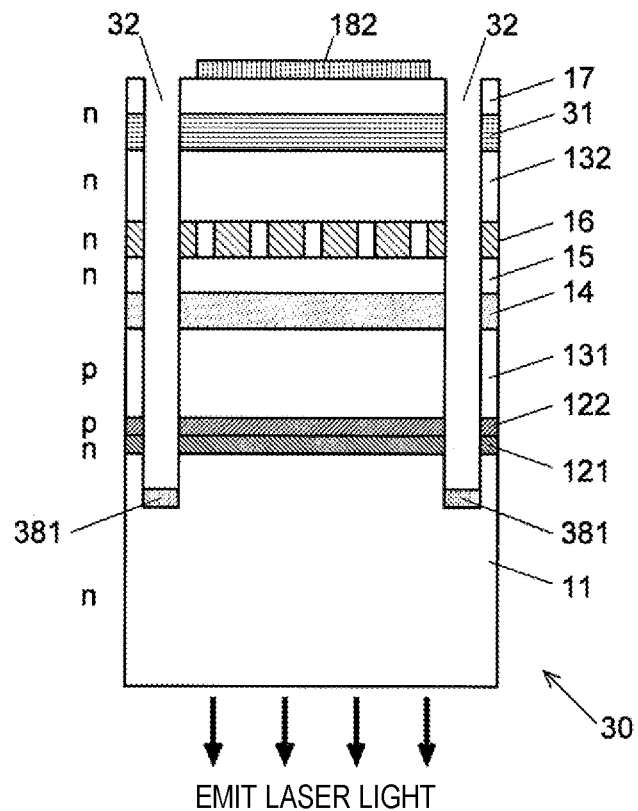
FIGS. 6A and 6B are schematic longitudinal sectional view (FIG. 6A) and a top view (FIG. 6B) illustrating a third embodiment of the two-dimensional photonic-crystal laser according to the present invention.
Figure 6B:
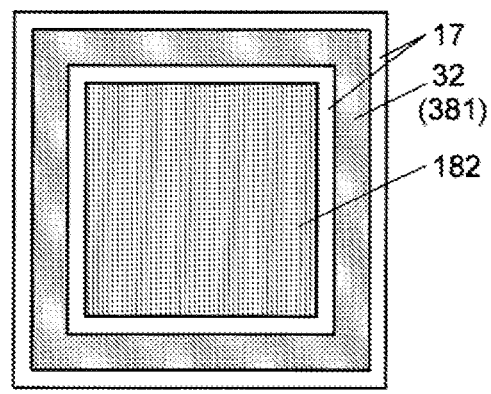

FIGS. 6A and 6B illustrate a schematic configuration of a two-dimensional photonic-crystal laser 30 of the third embodiment. This two-dimensional photonic-crystal laser 30 is different from the two-dimensional photonic-crystal lasers 10 and 20 of the first and second embodiments in that a groove 32 is included, and a first electrode 381 is provided on a bottom face of the groove 32, and a reflection layer 31 is provided between the n-type cladding layer 132 and the contact layer 17. Hereinafter, similar configurations to those of the two-dimensional photonic-crystal lasers 10 and 20 of the first and second embodiments will not be described, and only the above-described differences will be described.

The groove 32 penetrates the reflection layer 31, the n-type cladding layer 132, the two-dimensional photonic-crystal layer 16, the carrier block layer 15, the active layer 14, the p-type cladding layer 131, the second tunnel layer 122, and the first tunnel layer 121 from the surface of the contact layer 17, and is dug down to a position between the upper face and the lower face of the substrate 11. The shape (planar shape) of the groove 32 in a cross section parallel to the two-dimensional photonic-crystal layer 16 (the same applies to other layers such as the contact layer 17) is a frame shape. The shape of the first electrode 381 provided on the bottom face of the groove 32 is a frame shape similar to the planar shape of the groove 32, and is similar to the shape of the frame portion 1811 of the first electrode 181 in the first embodiment. Since the first electrode 381 is provided on the bottom face of the groove 32 in this manner, the position of the first electrode 381 in the vertical direction is a position between the upper face and the lower face of the substrate 11.

The reflection layer 31 is provided between the n-type cladding layer 132 and the contact layer 17 as described above. As the reflection layer 31, similarly to the reflection layer 21 in the second embodiment, one including DBR can be used.

According to the two-dimensional photonic-crystal laser 30 of the third embodiment, by providing the first electrode 381 on the bottom face of the groove 32 having the bottom face at the position between the upper face and the lower face of the substrate 11, the electric resistance between the first electrode 381 and the active layer 14 is reduced as compared with the case of the first embodiment in which the first electrode 181 is provided on the lower face of the substrate 11. This makes it possible to supply charges to the active layer 14 more efficiently.

In addition, according to the two-dimensional photonic-crystal laser 30 of the third embodiment, since the planar shape of the first electrode 381 is a frame shape, the laser light passes through inside the frame of the first electrode 381 and is emitted from the surface of the substrate 11 to the outside. Therefore, it is possible to suppress the first electrode 381 from hindering emission of laser light and causing unnecessary diffraction.

Furthermore, the two-dimensional photonic-crystal laser 30 of the third embodiment can be easily prepared in the following points. In the two-dimensional photonic-crystal lasers and 20 of the first and second embodiments, since each layer such as the second tunnel layer 122 is prepared on the upper face of the substrate 11 and the first electrodes 181 and 281 are prepared on the lower face, it is necessary to invert the upper and lower sides of the substrate 11 between the preparation of each layer and the preparation of the first electrodes 181 and 281. On the other hand, in the two-dimensional photonic-crystal laser 30 of the third embodiment, since both of each layer such as the second tunnel layer 122 and the first electrode 381 are prepared on the upper face of the substrate 11, it is not necessary to invert the upper and lower sides of the substrate 11, and manufacturing becomes easy.

While the two embodiments according to the present invention have been described above, the present invention is not limited to these embodiments, and various modifications can be made within the scope of the gist of the present invention.

Figure 7A:
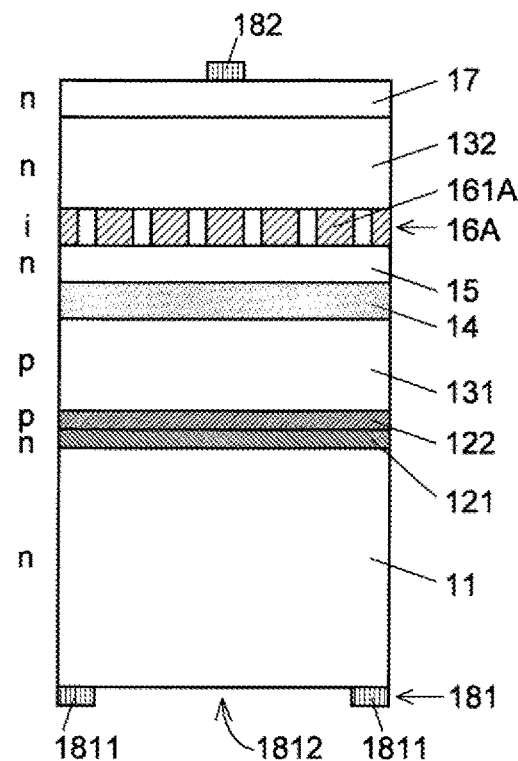
FIGS. 7A and 7B are schematic configuration diagrams illustrating a modification (a) and another modification (b) of the two-dimensional photonic-crystal laser of the first embodiment.
Figure 7B:
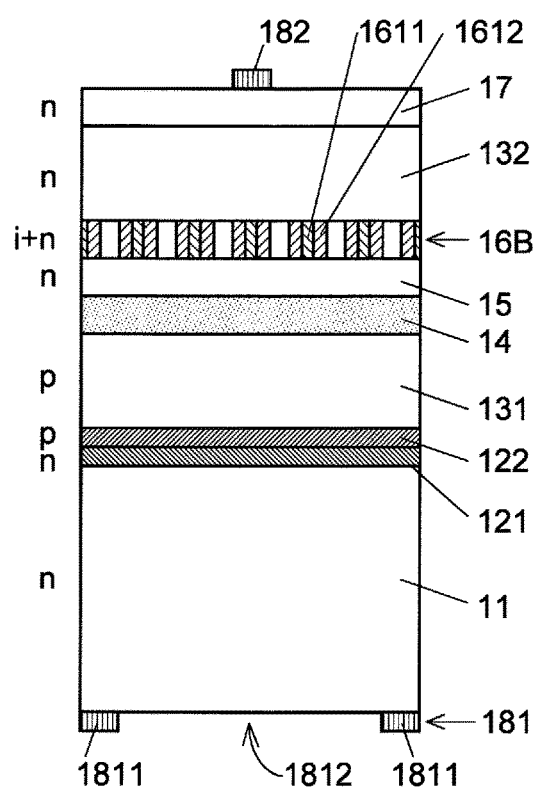

For example, in the two-dimensional photonic-crystal laser 10 of each of the above embodiments, an n-type semiconductor is used as the material of the base body 161, but in order to further suppress the absorption loss of light due to free carriers, as illustrated in FIG. 7A, a non-carrier-doped semiconductor (described as "i" in the figure) may be used as the material of a base body 161A of a two-dimensional photonic-crystal layer 16A. Alternatively, in order to facilitate the flow of electric current from the second electrode 182 side to the active layer 14 side, as illustrated in FIG. 7B, an n-type semiconductor may be used for a portion 1611 (in one example, 30% in area ratio) of a base body 161B of a two-dimensional photonic-crystal layer 16B, and a non-carrier-doped semiconductor may be used for a remaining portion 1612 (in the one example, 70% in area ratio).

While in the two-dimensional photonic-crystal laser 20 of the second embodiment, the second electrode 282 smaller in area than the first electrode 281 is provided near the center of the upper face of the contact layer 17, but instead, a window-shaped electrode having a frame portion and a window portion similar to those of the first electrode 181 in the first embodiment may be provided on the upper face of the contact layer 17 as the second electrode. In general, in a case where one electrode is provided with an electrode covering the entire substrate as in the first electrode 281 of the second embodiment, providing a window-shaped electrode to the other electrode makes it difficult to supply charges near the center of the two-dimensional photonic-crystal layer. However, as in the second embodiment, use of an n-type semiconductor for the cladding layer (n-type cladding layer 132) provided between the second electrode 282 and the two-dimensional photonic-crystal layer 16 and the contact layer 17 makes it possible to increase the mobility of charges (electrons). Therefore, even if a window-shaped electrode is used for the second electrode 282, it is possible to supply charges near the center of the two-dimensional photonic-crystal layer 16.

While in the two-dimensional photonic-crystal laser 30 of the third embodiment, the first electrode 381 is provided on the bottom face of the groove 32, and the reflection layer 31 is provided between the n-type cladding layer 132 and the contact layer 17. However, after the first electrode 381 is provided to the bottom face of the groove 32, the reflection layer 21 may be provided between the second tunnel layer 122 and the p-type cladding layer 131 in place of the reflection layer 31. Alternatively, after the reflection layer 31 is provided between the n-type cladding layer 132 and the contact layer 17, the first electrode 181 may be provided on the lower face of the substrate 11 without providing the groove 32 and the first electrode 381 on the bottom face of the groove 32.

In addition, the constituent elements of the two-dimensional photonic-crystal laser of each of the above embodiments and modifications may be appropriately combined.

REFERENCE SIGNS LIST 10, 20, 30 . . . Two-Dimensional Photonic-Crystal Laser
11 . . . Substrate
121 . . . First Tunnel Layer
122 . . . Second Tunnel Layer
131 . . . p-Type Cladding Layer
132 . . . n-Type Cladding Layer
14 . . . Active Layer
15 . . . Carrier Block Layer
16, 16A, 16B . . . Two-Dimensional Photonic-Crystal Layer
161, 161A, 161B . . . Base Body
1611 . . . Portion of Base Body
1612 . . . Portion Other Than Portion 1611 of Base Body
162 . . . Modified Refractive Index Area
17 . . . Contact Layer
181, 281, 381 . . . First Electrode
1811 . . . Frame Portion
1812 . . . Window Portion
182, 282 . . . Second Electrode
19 . . . Charge Supply Area
21, 31 . . . Reflection Layer
32 . . . Groove

The invention claimed is:

1. A two-dimensional photonic-crystal laser comprising:
a) a substrate made of an n-type semiconductor;
b) a p-type semiconductor layer provided on an upper side of the substrate and made of a p-type semiconductor;
c) an active layer provided on an upper side of the p-type semiconductor layer;
d) a two-dimensional photonic-crystal layer provided on an upper side of the active layer and including a plate-shaped base body made of an n-type semiconductor in which modified refractive index areas whose refractive index differs from the base body are periodically arranged;
e) a first tunnel layer provided between the substrate and the p-type semiconductor layer and made of an n-type semiconductor having a carrier density higher than a carrier density of the substrate;
f) a second tunnel layer provided in contact with the first tunnel layer between the first tunnel layer and the p-type semiconductor layer, and made of a p-type semiconductor having a carrier density higher than a carrier density of the p-type semiconductor layer;
g) a first electrode provided on a lower side of the substrate or in the substrate; and
h) a second electrode provided on an upper side of the two-dimensional photonic-crystal layer.

2. The two-dimensional photonic-crystal laser according to claim 1 further comprising a reflection layer configured to reflect laser light generated in the two-dimensional photonic-crystal layer between the second tunnel layer and the p-type semiconductor layer.

3. The two-dimensional photonic-crystal laser according to claim 1 further comprising a reflection layer configured to reflect laser light generated in the two-dimensional photonic-crystal layer between the two-dimensional photonic-crystal layer and the second electrode.

4. The two-dimensional photonic-crystal laser according to claim 1 further comprising
a groove provided from a surface on an upper side of the two-dimensional photonic-crystal laser, having a bottom face at a position between an upper face and a lower face of the substrate, and having a frame-like shape in a cross section parallel to the two-dimensional photonic-crystal layer,
wherein the first electrode is provided on the bottom face of the groove.

5. The two-dimensional photonic-crystal laser according to claim 1, wherein
materials of the substrate and the base body of the two-dimensional photonic-crystal layer is are n-type GaAs or n-type AlGaAs,
a material of the p-type semiconductor layer is p-type GaAs or p-type AlGaAs,
a material of the first tunnel layer is n-type InGaAs, and
a material of the second tunnel layer is p-type InGaAs.

6. The two-dimensional photonic-crystal laser according to claim 1, wherein an entire or a portion of the base body is made of a non-carrier-doped semiconductor in place of an n-type semiconductor.

* * * * *